United States Patent [19]

Nojiri et al.

[11] 4,421,867
[45] Dec. 20, 1983

[54] COMPOSITION FOR A CROSSLINKED POLYOLEFIN FOAM

[75] Inventors: Akio Nojiri, Kawasaki; Takashi Sawasaki; Isamu Noguchi, both of Tokyo; Shinji Onobori, Hatano; Junnosuke Sasazima, Hiratsuka, all of Japan

[73] Assignee: The Furukawa Electric Co., Ltd., Tokyo, Japan

[21] Appl. No.: 358,684

[22] Filed: Mar. 16, 1982

Related U.S. Application Data

[63] Continuation-in-part of Ser. No. 179,477, Aug. 18, 1980, abandoned.

[30] Foreign Application Priority Data

Aug. 29, 1979 [JP] Japan .................................. 54-110063

[51] Int. Cl.³ ............................................. C08J 9/12
[52] U.S. Cl. .......................................... 521/82; 521/88; 521/134; 521/140; 521/915; 525/240

[58] Field of Search ................... 521/82, 88, 134, 140; 525/240

[56] References Cited

U.S. PATENT DOCUMENTS

| | | | |
|---|---|---|---|
| 3,549,563 | 12/1910 | Hill et al. | 521/134 |
| 3,846,349 | 11/1974 | Harada et al. | 521/134 |
| 3,929,689 | 12/1975 | Walton et al. | 521/134 |
| 3,950,278 | 4/1976 | Wada et al. | 521/134 |
| 3,965,054 | 6/1976 | Nojiri et al. | 521/134 |
| 4,055,695 | 10/1977 | Last et al. | 521/134 |

*Primary Examiner*—Morton Foelak
*Attorney, Agent, or Firm*—Frishauf, Holtz, Goodman & Woodward

[57] ABSTRACT

A composition for a crosslinked polyolefin foam is prepared from 20 to 75% by weight of a crystalline propylene copolymer containing 1 to 15% by weight of ethylene and having a crystallinity higher than 50% and 80 to 25% by weight of polyethylene.

12 Claims, 1 Drawing Figure

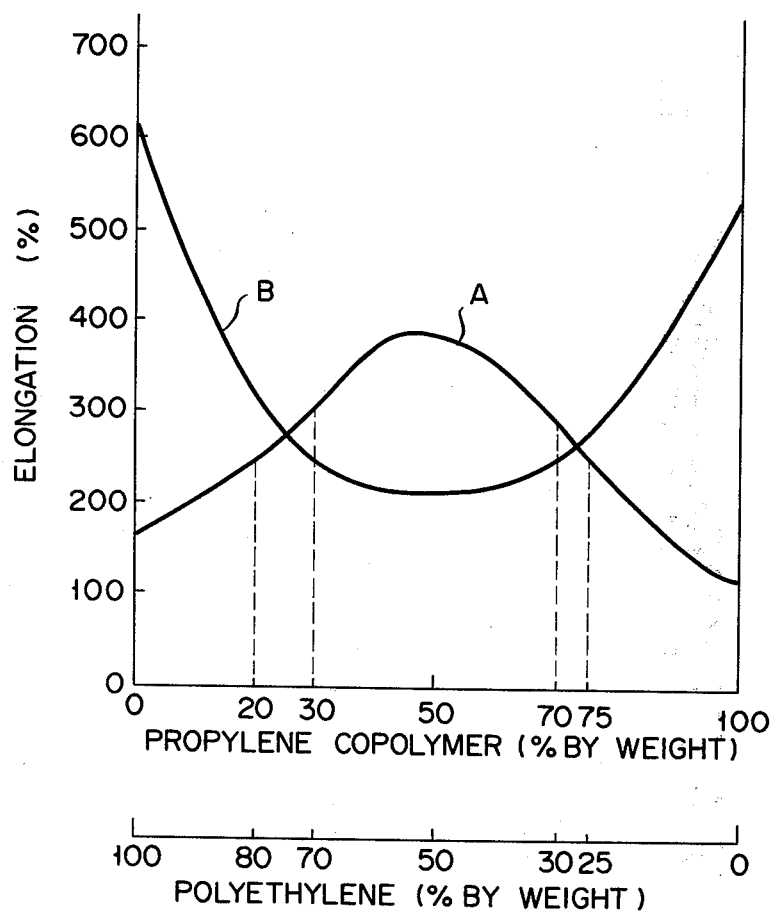

COMPOSITION FOR A CROSSLINKED POLYOLEFIN FOAM

This application is a continuation-in-part of application Ser. No. 179,477, filed on Aug. 18, 1980, now abandoned.

This invention relates to a composition well adapted for thermoforming, for example, vacuum forming or compression forming of a crosslinked polyolefin foam, and also to a foam prepared from the composition.

A crosslinked polyolefin foam, particularly crosslinked polyethylene foam which generally has good flexibility and heat insulation is widely accepted as heat insulating material or sundry goods after subjected to secondary processing such as laminating and thermoforming. In recent years, the crosslinked polyethylene foam is much desired, for example, as a heat-insulating member of a car cooler, or a box-shaped heat insulating member of an icebox or cushioning medium, etc. Therefore, a heat-insulating product and sundry goods are often manufactured by the vacuum forming or compression forming of a crosslinked polyethylene foam sheet. However, a commercially available crosslinked polyolefin foam has low thermoformability, presenting considerable difficulties in effecting a higher draw ratio than 0.7 (the draw ratio is represented by the ratio of the depth of a box-shaped foam sheet by draw forming to the length of the longer side of the bottom plane), and consequently failing to provide formings sufficiently withstanding application.

The present inventors have conducted studies in view of the above-mentioned circumstances, and as a result have succeeded in developing a composition capable of producing a crosslinked polyolefin foam which not only retains heat resistance, heat insulation, shock absorbing properties and flexibility which are possessed by the conventional crosslinked polyolefin foam, but also prominently excels in thermoformability, particularly vacuum formability and compression formability.

Namely, this invention relates to a composition for use in a crosslinked polyolefin foam having a closed cell structure which comprises a mixture of 20 to 75% by weight of a crystalline propylene copolymer containing 1 to 15% by weight of ethylene and having a crystallinity higher than 50% and 80 to 25% by weight of polyethylene.

A crosslinked polyolefin foam with a closed cell structure prepared from a composition embodying this invention has an elongation of more than 250% at room temperature, which is a far larger value as compared with crosslinked polyethylene foam and crosslinked polypropylene foam, made by the prior art, having an elongation of not more than 150% and 100% respectively at room temperature. In other words, the crosslinked polyolefin foam of the invention ensures deep draw vacuum forming with a high draw ratio of 0.7 to 2 or more.

The accompanying drawing graphically shows the elongation characteristic of a crosslinked polyolefin foam prepared from a composition embodying this invention. Curve A denotes that percentage elongation of a crosslinked foam prepared from a mixture of a propylene copolymer and polyethylene which corresponds to the proportions (% by weight) of the respective components of said mixture. Curve B represents that percentage elongation of a nonfoamed but only crosslinked product prepared from a mixture of a propylene copolymer and polyethylene which corresponds to the proportions (% by weight) of the respective components of said mixture. Detailed description is given of the above-mentioned elongation in Example 3 and Control 5.

A composition embodying this invention for a crosslinked polyolefin foam provides a crosslinked foam which displays an unexpectedly high elongation and prominent thermoformability.

Detailed description is now given of said composition embodying the invention. A propylene copolymer used in the preparation of said composition contains 1 to 15% by weight of ethylene, has a melt index (M.I.) of 1 to 20 and a crystallinity higher than 50% and is preferred to be a random or block copolymer containing 2 to 9% by weight of ethylene. These copolymers can be distinguished from a homopolymer by the differential scanning calorimeter (DSC). A polymer which indicates only one endothermic peak at a temperature from 162° to 170° C. as measured at a heating rate of 5° C./min is a propylene homopolymer. A polymer which displays a broad small endothermic peak in the proximity of 120° C. and a large endothermic peak in the proximity of 160° C. is a propylene block copolymer. A polymer which shows a broad fusion curve over a temperature range of 100° to 160° C. is a propylene random copolymer. In view of the required crosslinking, extrudability and thermoformability, the above-mentioned propylene copolymer is preferably used in this invention. It is more preferred to apply the type which shows a fusion peak at a temperature as over 138° to less than 158° C. (a shoulder section in the fusion curve is not regarded as a peak). A most preferred type of propylene copolymer for high extrudability is that which indicates a fusion peak at a temperature of less than 150° C.

The propylene copolymer used in this invention is crystalline, the crystallinity of which can be measured by the infrared absorption method. The relationship between the absorbance ratio and the tacticity of the polymer is known to the art, i.e., absorbance ratio between 995 $cm^{-1}$ band and 974 $cm^{-1}$ band. In general, the crystallinity is determined from the above-noted relationship on the assumption that the tacticity is substantially equal to the crystallinity. The propylene copolymer used in this invention has at least 50% of crystallinity. Incidentally, the crystallinity of atactic polypropylene is substantially zero. Also, the propylene component of the ordinary ethylene-propylene rubber has a tacticity of at most 10%.

The type of polyethylene used in this invention is not subject to any particular limitation. However, the so-called medium density polyethylene is preferred whose density ranges between 0.920 to 0.945 $g/cm^3$. More preferred medium density polyethylene is the type whose density ranges between 0.923 and 0.937 $g/cm^3$. These types of polyethylene are, to be precise, copolymers of ethylene and a small amount of any of the other α-olefins such as propylene, butene-1 and hexene-1. The above-mentioned polyethylene is generally manufactured by the low and medium pressure polymerization method such as the Ziegler and Phillips processes. More preferred polyethylene is the type which has a density falling within the above-mentioned range and in which the absorptivity coefficient $K'_{770\ cm-1}$ (expressed by the following equation) of an infrared absorption spectrum which shows the presence of a longer chain branch than an ethyl branch $$K'_{770} \text{cm}^{-1} = \frac{1}{dl} \cdot \log \frac{I_o}{I}$$

has a value falling within the range of 0.5 to 7.
In the above-mentioned equation,
d = density (g/cm$^3$)
l = film thickness (cm)
$I_o$ = transmittance of a base line at 770 cm$^{-1}$
I = transmittance of an absorption at 770 cm$^{-1}$ The melt indices of polyethylene and propylene copolymer used to prepare a composition embodying this invention are not subject to any particular limitation. Where, however, a foamable sheet for a crosslinked polyolefin foam is prepared, for example, by an extruder from a mixture of both polymers blended with a blowing agent and, if necessary, a crosslinking agent, then the polyethylene is chosen to have a melt index ranging between 1 and 10 or preferably between 1 to 8, and the propylene copolymer is desired to have a melt index ranging between 1 and 20, or preferably between 4 and 15.

For the object of this invention, 80 yo 25% by weight of polyethylene is mixed with 20 to 75% by weight of propylene copolymer. It is preferred to mix 70 to 30% by weight of polyethylene with 30 to 70% by weight of a propylene copolymer.

A polyolefin foam embodying this invention having the above-mentioned composition has a density of about 0.25 to 0.02 g/cm$^3$, a closed cell structure, a greater elongation than 250% at 20° C. and a satisfactory thermoformability. Further, a crosslinked foam produced of 65 to 45% by weight of polyethylene having a medium density of 0.920 to 0.945 g/cm$^3$ and 35 to 55% by weight of a propylene-ethylene random copolymer containing 1 to 15% by weight of ethylene is extremely preferred because said foam has a greater elongation than 300% at 20° C., and is noticeably improved in the property of thermoforming including vacuum forming and allows for a deep draw ratio having as high a draw ratio as 2.0.

A composition embodying this invention for a crosslinked polyolefin foam comprises a mixture of polyethylene and propylene copolymer blended with the above-defined proportions. However, it is possible to add any other polymer to said mixture. The proportion of said additional polymer is chosen to be less than 50% or preferably less than 30% by weight. Said additional polymer is desired to be a polymer compatible with the aforesaid polyolefins such as polybutene-1, polypropylene homopolymer, ethylene-vinyl acetate copolymer, ethylene-ethyl acrylate copolymer, polystyrene, ethylene-propylene rubber and styrenebutadiene rubber alone or a mixture thereof. It is also possible to blend the above-mentioned mixture with such additives as an inorganic filler, pigment, antioxidant, ultraviolet absorber and other processing aids.

The crosslinking of a composition embodying this invention for a crosslinked polyolefin foam is commonly carried out by irradiating electron beams on the composition containing polyfunctional compounds such as divinylbenzene, triallyl cyanurate, diethyleneglycol diacrylate, and diallyl phthalate prepolymer and, if necessary, monofunctional monomers such as styrene and vinyl toluene. The crosslinking process may also be effected by blending the composition embodying this invention with organic peroxides such as dicumyl peroxide, and 2,5-dimethyl-2,5-di(t-butylperoxy)hexyne-3, and polyfunctional compounds such as triallyl isocyanurate and trimethylol propane triacrylate and applying heat and pressure to the blended mass. Further, it is possible to conduct the crosslinking process by blending the composition embodying this invention with silane compounds such as vinyl trimethoxy silane and vinyl triethoxy silane, and a small amount of organic peroxides such as dicumyl peroxide and di-t-butyl peroxide, thereby grafting the polymer contained in the composition embodying this invention, and further mixing said grafted polymer with a silanol condensation catalyst such as dibutyl tin dilaurate in the presence of water. Any of the above-mentioned crosslinking processes should advisably be undertaken before the foaming of the composition or at the same time as said foaming.

The crosslinking degree varies with, for example, the method of manufacturing a crosslinked polyolefin foam, the proportions of polyethylene and propylene copolymer contained in the composition and the molecular weights of the respective component polymers. However, the crosslinking well serves the purpose if it is carried out to such degree that where a crosslinked foam is extracted for 12 hours at 135° C. with tetralin used as an extraction solvent, the resultant gel content ranges between 20 and 80% by weight. Said gel content preferably ranges between 20 and 50% by weight. The reason for this is that a smaller gal content than 20% by weight causes the crosslinked foam to decrease in mechanical strength, though increased elongation; and conversely a larger gel content than 80% undesirably causes the crosslinked foam to have a low elongation even upon application of heat and be reduced in the vacuum formability.

The above-noted gel content of the crosslinked polyolefin foam of this invention represents the sum of gel content of polyethylene and gel content of propylene copolymer, i.e., percentage of the sum based on the total weight of the foam. Also, the polyethylene gel content based on the total weight of the polyethylene contained in the polymer blend is about 10 to 50%, with the propylene copolymer gel content based on the total weight of the copolymer contained in the polymer blend being about 30 to 90%.

In the manufacturing process of a crosslinked polyolefin foam, a preferred crosslinked polyolefin foam is produced by mixing the composition embodying this invention with a blowing agent, triacrylate or trimethacrylate of aliphatic polyhydric alcohol and phenolic derivative, irradiating the mixture at an absorbed dose of 0.5 to 5 Mrad and thermally foaming it.

The triacrylate or trimethacrylate of aliphatic polyhydric alcohol used in this invention includes trimethacrylate, trimethylol ethane triacrylate, tetramethylol methane triacrylate. The added proportion of these acrylates is chosen to be 0.5 to 4.0 parts per hundred parts of resin (phr). A lower phr rate than 0.5 does not give rise to crosslinking. A higher gas rate than 4.0 results in the growth of a foam full of voids. The preferred added proportion of said acrylates is chosen to range between 1.0 and 2.5 phr.

Derivatives of phenolic compounds also usable in this invention include, for example, 2,6-di-t-butyl-4-methyl phenol; 2,5-dimethyl hydroquinone; 2,2-bis(4-hydroxy-3,5-dimethyl phenyl) propane; 2,4,6-trimethyl phenol; bis(4-hydroxy-3,5-di-t-butyl phenyl) sulfide; bis(2-hydroxy-3,5-dimethyl phenyl) methane; bis(3-hydroxy-2,5-tetramethyl phenyl) methane; 1,3,5-trimethyl-2,4,6-tris-(3,5-di-t-butyl-4-hydroxybenzyl)benzene; 1,1,3-tris- (5-t-butyl-4-hydroxy-2-methyl phenyl) butane; octadecyl-3-(3',5'-di-t-butyl-4'-hydroxy phenyl) propionate; pentaerythrityl-tetrakis [3-(3,5-di-t-butyl-4-hydroxy phenyl) propionate]; and tris-(3,5-di-t-butyl-4-hydroxybenzyl) isocyanate. Particularly preferred are compounds having at least three hydroxyl groups such as 1,1,3-tris-(5-t-butyl-4-hydroxy-2-methyl phenyl) butane; octadecyl-3-(3',5'-di-t-butyl-4'-hydroxy phenyl) propionate; tris-(3,5-di-t-butyl-4-hydroxybenzyl) isocyanurate; 1,3,5-trimethyl-2,4,6-tris-(3,5-di-t-butyl-4-hydroxybenzyl) benzene and pentaerythrityltetrakis [3-(3,5-di-t-butyl-4-hydroxy phenyl) propionate].

The phenolic compound derivative serves to enhance the crosslinking effect even when added in a small amount. Further, if foaming is carried out in the air in the absence of the phenolic compound derivative, the produced foam tends to shrink. The reason for this is unclear.

The amount of the phenolic compound derivative ranges from 0.01 to 5.0 phr. If the amount exceeds 5.0 phr, the crosslinking reaction is adversely affected. Conversely, if the amount of the phenolic compound derivative is smaller than 0.01 phr, then the above-mentioned effect is not produced. The amount of a phenolic compound derivative having at least three hydroxy groups used in this invention is preferred to range between 0.05 and 1.0.

A composition embodying this invention for a crosslinked polyolefin foam is irradiated by ionizing radiations which include γ rays and β rays emitted from a radioactive isotope and electron beams and X-rays from an electron accelerator. The absorbed dose of said ionizing radiations is chosen to be from 0.1 to 10 Mard, preferably from 0.5 to 5 Mrad, more preferably from 1 to 3 Mrad.

A preferred crosslinked polyolefin foam is produced by foaming a composition embodying this invention by the steps of mixing the prescribed polymer blend with 0.5 to 30 phr of a solid blowing agent such as azodicarbon amide, dinitrosopentamethylene tetramine, and p-toluenesulfonyl semicarbazide and applying thermal decomposition or effecting said foaming by 0.5 to 40 phr of aliphatic hydrocarbons such as butane and pentane or halogenated hydrocarbons such as dichlorodifluoromethane. Or said foaming may be carried out by a normally gaseous inorganic gas such as nitrogen gas.

A foamable shaped sheet is commonly prepared by supplying the prescribed polymer blend previously mixed with a blowing agent to an extruder or supplying said polymer blend, said blowing agent and other additives to the extruder at the same time. In some cases, however, a crosslinked foamable sheet is directly drawn out from a die of an extruder with crosslinking carried out in the extruder. Where solvent or gas is applied as a blowing agent, there may be used the conventional process comprises introducing said polymer blend and the blowing agent into the extruder and extrusion foaming the mixture after or at the same time with crosslinking.

Further the composition for a crosslinked polyolefin foam is sometimes previously subjected to crosslinking in the form of pellet or shaped article. Later, the crosslinked mass is impregnated with a blowing agent, followed by thermal foaming.

Heating for foaming is generally carried out by hot air, infrared rays, salt bath, or oil bath. Or as previously described, heating is applied in an extruder itself.

A process adapted to produce a crosslinked polyolefin foam from a foamable sheet for a crosslinked polyolefin foam is known which comprises placing a foamable polyolefin composition sheet on a stainless steel net endless conveyor traveling through a hot air furnace at its entrance, carrying out the foaming of said sheet and taking out the foamed sheet at the exit of the furnace. The polyolefin melts during foaming process. Unless, therefore, properly supported, the molten foamable sheet is stretched by its self weight. Consequently, it is necessary to foam said sheet while it is carried by a support like a wire net. The wire net is adapted for foaming. The reason for this is that since the molten sheet during the foaming process is ready to stick to a support, the wire net not only reduces the area of the support to which the molten sheet is ready to adhere but also effects the uniform application of heat to the upper and lower sides of the sheet by facilitating the passage or hot air.

A composition embodying this invention for a crosslinked polyolefin foam is particularly suited for the above-mentioned conventional foaming process. Though fundamentally suited for the production of a foamed polyolefin sheet, said conventional foaming process does not always fully serve the purpose. For instance, depending on the kind and composition of polyolefins and the crosslinking degree thereof, the molten sheet undesirably sticks to a wire net, failing to provide a properly foamed sheet, or otherwise that side of the foamed sheet which contacts the wire net is marked with the pattern of said wire net.

However, a composition embodying this invention for a crosslinked polyolefin foam is not adhesive to a wire net, thereby providing a foamed sheet free from the pattern of the wire net. Therefore, the composition of the invention is particularly suited for the above-mentioned conventional foaming process.

A composition embodying this invention for a crosslinked polyolefin foam is generally foamed to 4 to 60 times the original volume. However, the foamed composition used for vacuum forming is generally the type foamed to 10 to 40 times the original volume.

This invention will be more fully understood with reference to the examples which follow.

EXAMPLE 1

55% by weight of medium density polyethylene produced by the low pressure process (M.I.: 4; density: 0.925 g/cm$^3$; and absorptivity coefficient: $K'_{770 \, cm-1} = 1.5$) was mixed with 45% by weight of propylene-ethylene random copolymer (M.I.: 7; ethylene content: 4% by weight; melting point: 147° C.; and crystallinity: 85%). 100 parts by weight of the mixture were blended with 15 parts by weight of azodicarbon amide as a blowing agent, 2.0 parts by weight of triallyl trimellitate as a crosslinking promoter and 0.2 part by weight of penthaerythrityl-tetrakis [3-(3,5-di-t-butyl-4-hydroxy phenyl) propionate] as a phenolic compound derivative (manufactured by Ciba Gigy under the trademark "Irganox 1010").

The mixture was extruded into a sheet having a thickness of 1.5 mm. Electron beams were irradiated on the sheet with an absorbed dose of 4.0 Mrad. The irradiated sheet was foamed while being carried on a wire net endless belt traveling through a foaming furnace with hot air of 230° C. The foamed sheet had a thickness of 4.5 mm, density of 0.032 g/cc (corresponding to an expansion ratio of 30 times), and a fine and closed cell-structure. Heating was applied to both sides of the foamed sheet for about 15 seconds by a pair of 10 KW infrared heaters respectively spaced 80 mm from both sides of the sheet. The heated sheet was subjected to vacuum forming with a draw ratio of 1.3, thereby fabricating a box-shaped glass case cushioning member measuring 260 mm (depth)×200 mm×200 mm. The vacuum forming was easily carried out. The box-shaped cushioning member was free from edge breakage and creases.

Control 1

It was tried to fabricate a box-shaped cushioning member of the previously mentioned dimensions of 260 mm (depth)×200 mm×200 mm by vacuum forming with a draw ratio of 1.3 as in Example 1 from a commercially available 4.5 mm thick crosslinked polyethylene foam sheet with a foamed density of 0.035 g/cm$^3$, which had been produced from the polyethylene of a density of 0.915 g/cm$^3$, a melt index of 1.0 and an absorptivity coefficient $K'_{770\ cm}-1$ of 0. It was also tried to produce by vacuum forming with a draw ratio of 1.3 as in Example 1, a similar box-shaped cushioning member having the same dimensions as described above from a commercially available 4.5 mm thick crosslinked polypropylene foam sheet with a foamed density of 0.034 g/cc, which had been produced from the polypropylene of a random copolymer containing 2.0% by weight of ethylene, and having a melt index of 10, melting point of 150° C. and a crystallinity of 90%. In both cases, however, the box-shaped cushioning member was broken at the edge, failing to provide a cushioning box of prescribed dimensions.

EXAMPLE 2

As in Example 1, 50% by weight of medium density polyethylene was mixed with 50% by weight of a propylene-ethylene random copolymer (containing 4% by weight of ethylene and having a melt index of 9.0, melting point of 143° C. and a crystallinity of 78%. The mixture was further blended with the same blowing agent, crosslinking agent and phenolic compound derivative as used in Example 1 and was foamed as in Example 1. The resultant crosslinked foam (having a closed cell structure and a density of 0.028 g/cc) indicated a tensile strength (kg/cm$^2$) and elongation (%) given in Table 1 below.

Controls 2 to 4

For comparison with Example 2, determination was made of the tensile strength (kg/cm$^2$) and elongation (%) of a commercially available crosslinked polyethylene foam (Control 2), commercially available crosslinked polypropylene foam (Control 3), and non-crosslinked polyethylene foam (Control 4), the results being also set forth in Table 1 below.

TABLE 1

| | Tensile strength and elongation of polyolefin foams | | |
|---|---|---|---|
| Kind of foam | Density (g/cc) | Tensile strength (kg/cm$^2$) | Elongation (%) |
| Example 2  Crosslinked foam | 0.028 | 6.5 | 310 |
| Control 2  Crosslinked polyethylene foam (M.I. = 1.0; $K'_{770}\ cm^{-1} = 0$; density = 0.914 g/cm$^3$) | 0.035 | 5.5 | 110 |
| Control 3  Crosslinked polypropylene foam (M.I. = 10; ethylene content = 4.0%, random copolymer; melting point = 141° C. crystallinity = 69%) | 0.034 | 6.9 | 80 |
| Control 4  Noncrosslinked polyethylene foam (M.I. = 0.7; $K'_{770}\ cm^{-1} = 0$; density = 0.918 g/cm$^3$) | 0.037 | 4.2 | 70 |

As seen from Table 1 above, a crosslinked foam (Example 2) prepared from a composition embodying this invention has a far larger elongation than those of Controls 2 to 4. Example 2 was still found to retain heat-resistant and heat-insulating properties originally possessed by a polyolefin foam. Therefore, a cross-linked foam of Example 2 proved to be extremely useful as a heat-resistant and heat-insulating covering material to be required for large elongation.

EXAMPLE 3

Sample mixtures of medium density polyethylene (density = 0.925 g/cm$^3$; M.I. = 4; $K'_{770\ cm}-1 = 2.1$) and propylene-ethylene random copolymer (M.I. = 9; ethylene content = 4% by weight; melqing point 141° C.; crystallinity = 70%) were provided with the proportions of the component polymers varied. 100 parts by weight of each sample mixture was blended with 15 parts by weight of azodicarbon amide as a blowing agent, 2 parts by weight of trimethylol propane triacrylate as a crosslinking promoter, and 0.3 part by weight of pentaerythrityltetrakis [3-(3-5-di-t-butyl-4-hydroxy phenyl)] propionate (manufactured by Ciba Gigy under the trademark "Irganox 1010"). The mixture was extruded into a 2 mm thick sheet, which was subjected to crosslinking by irradiating electron beams with an absorbed dose of 2.0 Mrad. All the crosslinked sample sheets were foamed at 230° C., producing several kinds of crosslinked foams with closed cells containing different amounts of polypropylene. Determination was made of the elongation (%) of said sample foams, the results being indicated by Curve A in the appended drawing. As apparent therefrom, sample crosslinked foams prepared from compositions whose propylene copolymer content falls outside of the range of 20 to 75% by weight defined for a composition embodying this invention showed a smaller elongation than the crosslinked foam of the invention. A crosslinked foam prepared from a composition embodying the invention whose polyethylene content is particularly defined to range between 70 to 30% by weight is shown to indicate a prominently large elongation as over 250%.

Control 5

Electron beams were irradiated with an absorbed dose of 2.0 Mrad on a sheet prepared from substantially the same composition as used in Example 3 (except that 15 phr of azodicarbon amide was omitted). Determination was made of the elongation of the resultant crosslinked sheet, the results being indicated by Curve B in the accompanying drawing. As apparent from Curve B, a composition formed of a mixture of polyethylene and propylene copolymer whose proportions are defined in accordance with the present invention rather indicates a small elongation if the composition is simply crosslinked without being foamed. Conversely where said composition is foamed, its elongation is prominently increased as seen from Curve A.

EXAMPLES 4 AND 5

Determination was made of the tensile strenght (kg/cm$^2$), elongation (%) and vacuum formability of sample crosslinked foams with closed cells prepared from compositions specified in Table 2 below, the results being given in Table 3 below.

Control 6

Determination was made of the tensile strength (kg/cm$^2$), elongation and vacuum formability of a sample crosslinked foam prepared from a composition specified in Table 2 below, the results being indicated in Table 3 below.

TABLE 2

|  | Polyethylene | Polypropylene |
|---|---|---|
| Example 4 | 55% by weight of medium density polyethylene (M.I. = 4.5; Density; 0.927; K'$_{770}$ cm$^{-1}$ = 1.8) | 45% by weight of propylene-ethylene copolymer (M.I. = 10; Melting point = 138° C.; Ethylene content = 6% by weight Crystallinity = 66%) |
| Control 6 | Same as above | 45% by weight of propylene homopolymer (M.I. = 6; Melting point = 164° C.) |
| Example 5 | 55% by weight of high density polyethylene (M.I. = 6; Density = 0.950; K'$_{770}$ cm$^{-1}$ = 0.6) | 45% by weight of propylene-ethylene copolymer (M.I. = 7; Melting point = 143° C.; Ethylene content = 4.5% by weight Crystallinity = 72%) |

TABLE 3

|  | Tensile strength (kg/cm$^2$) | Elongation (%) | Crosslinking degree (%) | Vacuum formability |
|---|---|---|---|---|
| Example 4 | 6.3 | 340 | 38 | Good |
| Control 6 | 6.9 | 85 | 60 | Bad |
| Example 5 | 7.2 | 200 | 48 | Good |

Note:
The crosslinking degree denotes a gel content. The vacuum formability was determined by a test for vacuum formability with the draw ratio set at 1.0.

As seen from Table 3 above, sample crosslinked foams of Example 4 and 5 prepared from compositions consisting of polyethylene of medium and high densities and propylene-ethylene copolymer have far larger elongations than a sample crosslinked foam of Control 6 prepared from a composition consisting of medium density polyethylene and propylene homopolymer.

EXAMPLE 6

Controls 7 and 8

Sample sheets each having a thickness of 1 mm were prepared from compositions shown in Table 4 below in the same manner as in Example 1. The sample sheets were foamed while being carried on a 20-mesh stainless steel net endless belt traveling at a speed of 2 meters/min through a foaming furnace through which air streams heated to 230° C. were circulated, providing closed cell foams shown in Table 5 below.

TABLE 4

|  | Example 5 | Control 7 | Control 8 |
|---|---|---|---|
| 100 parts by weight of resin | the same resin mixture as in Example 2 | the same propylene-ethylene random copolymer as in Example 2 | Same as left |
| 15 parts by weight of blowing agent | Azodicarbon amide | Same as left | Same as left |
| Crosslinking promoter | 1.8 parts by weight of trimethylol propane triacrylate | Same as left | 4.0 parts by weight of divinyl benzene |
| Absorbed dose | 2.0 Mrad | 2.0 Mrad | 8.0 Mrad |

TABLE 5

|  | Example 5 | Control 7 | Control 8 |
|---|---|---|---|
| Density (g/cm$^3$) | 0.032 | 0.040 | 0.038 |
| Gel content (%) | 35 | 55 | 62 |
| Elongation (%) | 350 | 160 | 120 |
| Surface condition | Very smooth | Noticeably marked with a wire net pattern | Same as left |

Table 5 above shows that a crosslinked foam embodying this invention is prominently improved in elongation and surface condition.

As mentioned above, a composition embodying this invention for a crosslinked polyolefin foam has a noticeable effect of, for example, easily providing a crosslinked polyolefin foam which retains the heat-resistant and heat-insulating properties, flexibility, and cushioning property possessed by the conventional crosslinked polyolefin foam and moreover displaying excellent thermoformability, particularly vacuum formability and compression formability.

What we claim is:

1. A foamable composition for making a closed cell polyolefin foam which comprises 20 to 75% by weight of crystalline propylene copolymer having a melt index of 1 to 20 and containing 1 to 15% by weight of ethylene and having a crystallinity higher than 50%, 80 to 25% by weight of polyethylene having a density of from 0.920 to 0.945 g/cm$^3$ and a melt index of 1 to 10, a polyfunctional organic monomeric cross-linking agent and a blowing agent.

2. The composition according to claim 1, wherein the propylene copolymer is a propylene-ethylene random copolymer which contains 2 to 9% by weight of ethylene.

3. The composition according to claim 1, wherein the polyethylene has a density of 0.923 to 0.937 g/cm$^3$.

4. The composition according to claim 1, which comprises 30 to 70% by weight of the propylene-ethylene random copolymer containing 2 to 9% by weight of ethylene, and 70 to 30% by weight of polyethylene.

5. The composition of claim 1 to be irradiated for crosslinking and foamed which comprises 20 to 75% by weight of a propylene copolymer containing 1 to 15% by weight of ethylene, 80 to 25% by weight of polyethylene, 0.5 to 4 phr of triacrylate or trimethacrylate of aliphatic polyhydric alcohol, 0.5 to 30 phr of a blowing agent and 0.01 to 5 phr of a phenolic compound derivative.

6. The composition according to claim 5, wherein the propylene copolymer is a propylene-ethylene random copolymer containing 2 to 9% by weight of ethylene.

7. The composition according to claim 5, wherein the polyethylene has a density of 0.923 to 0.937 g/cm$^3$.

8. The composition according to claim 5, which comprises 30 to 70% by weight of a propylene-ethylene random copolymer containing 2 to 9% by weight of ethylene, 70 to 30% by weight of polyethylene, 1.0 to 2.5 phr of triacrylate or trimethacrylate or aliphatic polyhydric alcohol, 0.5 to 30 phr of a blowing agent and 0.05 to 1.0 phr of a phenolic compound derivative.

9. A crosslinked polyolefin foam sheet having a closed cell structure which has been cross-linked using a polyfunctional organic monomeric cross-linking agent which comprises 20 to 75% by weight of a propylene copolymer having a melt index of 1 to 20 and containing 1 to 15% by weight of ethylene and having a crystallinity higher than 50% and 80 to 25% by weight of polyethylene having a melt index of 1 to 10 and a density of 0.920 to 0.945 g/cm$^3$.

10. The crosslinked polyolefin foam sheet having a closed cell structure according to claim 9, wherein the propylene copolymer is a propylene-ethylene random copolymer containing 2 to 9% by weight of ethylene.

11. The crosslinked polyolefin foam sheet having a closed cell structure according to claim 9, wherein the polyethylene has a density of 0.923 to 0.937 g/cm$^3$.

12. The crosslinked polyolefin foam sheet having a closed cell structure according to claim 9, which comprises 30 to 70% by weight of a propylene-ethylene random copolymer containing 2 to 9% by weight of ethylene and having a crystallinity higher than 50%, and 70 and 30% by weight of polyethylene.

* * * * *